United States Patent [19]
Banner

[11] 3,863,347
[45] Feb. 4, 1975

[54] NAVIGATION DEVICE

[76] Inventor: Philip Michael Banner, 28 Oxford Road, Massapequa, N.Y. 11758

[22] Filed: Nov. 21, 1972

[21] Appl. No.: 308,350

Related U.S. Application Data

[63] Continuation-in-part of Ser. No. 27,535, April 13, 1970, Pat. No. 3,721,007.

[52] U.S. Cl.................... 33/98, 33/75 R, 33/76 V, 33/1 SB
[51] Int. Cl.............................................. B43l 7/06
[58] Field of Search ... 33/76 VA, 1 SD, 1 SB, 75 R, 33/97, 98

[56] References Cited
UNITED STATES PATENTS

| | | | |
|---|---|---|---|
| 1,429,463 | 9/1922 | Squyer | 33/1 SD |
| 1,501,588 | 7/1924 | Ellison | 33/98 |
| 2,370,753 | 3/1945 | Reece | 33/76 VA |
| 2,477,556 | 7/1949 | Shaw | 33/1 SD |

FOREIGN PATENTS OR APPLICATIONS

| | | | |
|---|---|---|---|
| 135,646 | 12/1919 | Great Britain | 33/76 VA |
| 19,570 | 0/1894 | Great Britain | 33/75 R |

*Primary Examiner*—Harry N. Haroian

[57] ABSTRACT

A navigation device comprising a base plate having angular markings, a plurality of round disc members rotatably mounted on said base plate and on each other, each of the round members being adapted to forward or backward movement to insert the navigation parameters such as compass deviation, compass reading, wind direction, current direction so that the various parameters are added to give a final reading to disclose the numerical extent of movement.

A pair of protractor arms are adapted to be rotatably mounted on top of the stack of round members for drawing a course on a chart, having linear scales, comprising a degree scale at the base independently swingable on a concentric pivotal axis, having a safety index marking.

A third protractor arm attachable to said pair of protractor arms comprising a linear scale attached to said arm by means of a pivotal slide having a pointer and degree scale in registration with said degree scale at the base to disclose the numerical extent of movement.

A fourth protractor arm attachable to said third arm comprising a linear scale, attached by a pivotal slide having a pointer and degree scale movable with and independently rotatable of the third arm having means to extend the length of the arms.

3 Claims, 17 Drawing Figures

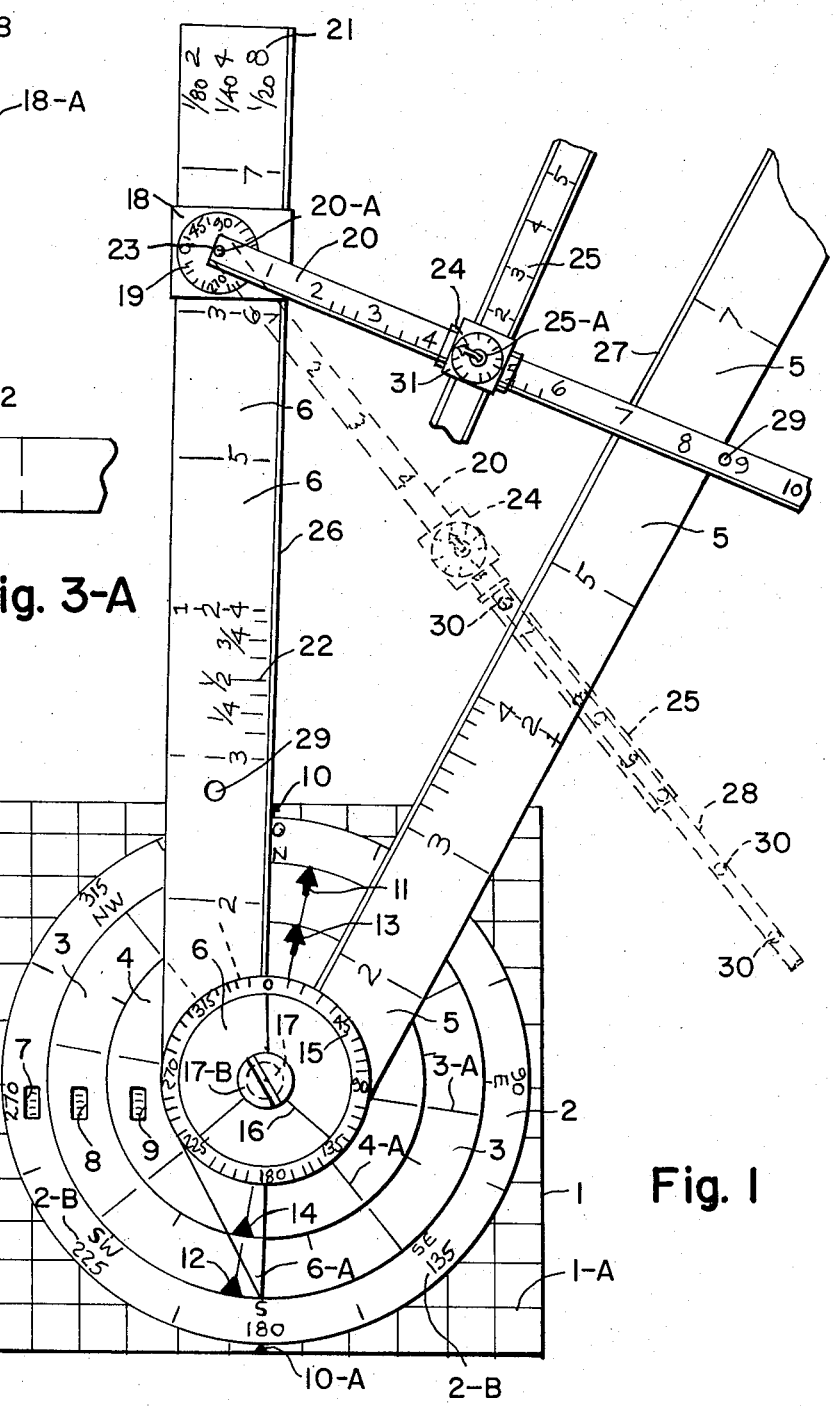

NAVIGATION DEVICE

This invention application is a continuation in part to my prior application Ser. No. 027,535 filed Apr. 13, 1970, now U.S. Pat. No. 3,721,007.

That patent shows a Navigation Calculator. The present application is an improvement by having a wind disc comprising a readout degree scale and a circular scale particularly useful for wind calculations. This application also has a current disc comprising a readout scale and a circular scale necessary for current calculation. The third and fourth protractor arm members attached by means of rotatable and pivotal slides such as I will describe further, wherein further objects and advantages of the invention will become apparent from the following description and claim and from the accompanying drawings.

This invention relates to a device to be employed in conjunction with a magnetic compass, and more particularly to a device to assist amateur and professional boatmen in navigation and furthering through invention the application and understanding of safe boat travel.

It is an object of my invention to provide in a compact, easily settable instrument a novel and improved device for reading bearings in cooperation with a magnetic compass, said device consisting of inexpensive components, of durable construction to withstand sea-use abuses within economical reach of small-craft owners.

A further object of the invention is to provide an improved navigation device for operational and teaching uses that will facilitate speedy accurate negotiation of determining the correct bearings and therefore safe travel through expanded use of the magnetic compass.

Another object of the invention is to provide means of calculating wind and current forces in cooperation with the magnetic compass.

Another object of the invention is to provide an accurate international safety disc at the base of one of the protractor arms affording visual advantages of rules of the road and lighting requirements necessary for safe jouney.

Another object of the invention is to provide a plurality of protractor arms in excess of the two arms originally shown that provide multiple advantages in cooperation with the scales of the device in addition to measuring courses linearly, determining vectors, assisting with dead-reckoning and fixing position, wherein each of the protractor arms is swingable on it's independent axis coordinating all of the important functions of magnetic compass calculations.

Another object of the invention is to provide a graphically visually orientated device for navigation that eliminates time-consuming tedious mathematical problems of vector solutions, distances and bearings that are easily solved by this device.

Another object of the invention is to provide a improved navigation device that performs all the uses of many instruments wherein some cases said other instruments would not be employed, The protractor arms perform parallel and diagonal movement having linear distance scales that reasonably provide all of the services one would accomplish by using this navigation device instead of several instruments that are time-consuming, requiring unavailable space and facilities on small craft that operate at high speed necessitating rapid accurate decisions.

Referring to the drawings:

FIG. 1 is a top plan view of an improved navigation device constructed in accordance with the present invention.

FIG. 2 is a cross sectional view.

FIG. 3 is an end view of a sliding indicator and assembly.

FIG. 3-A is an end view of a sliding indicator having two slide assemblies in one unit showing the means of pivotal axis.

Figure 4:
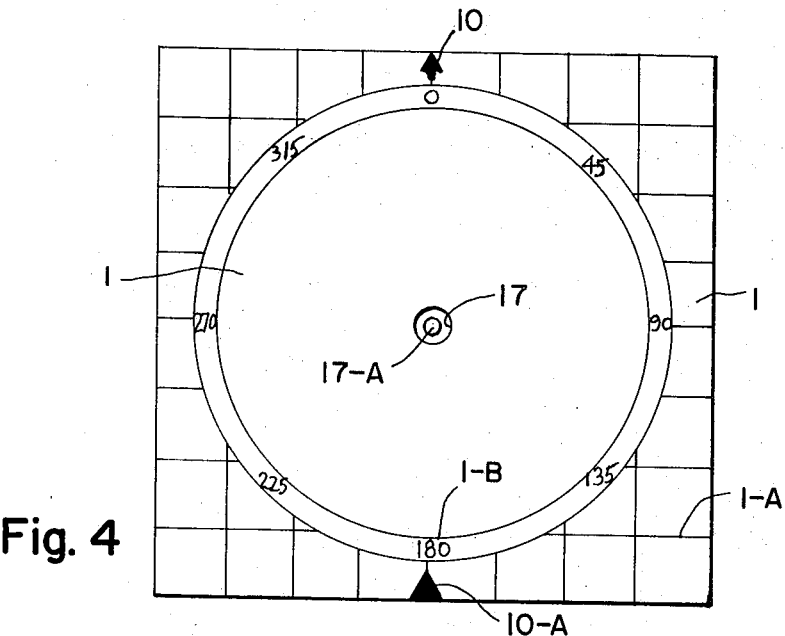
Figure 5:
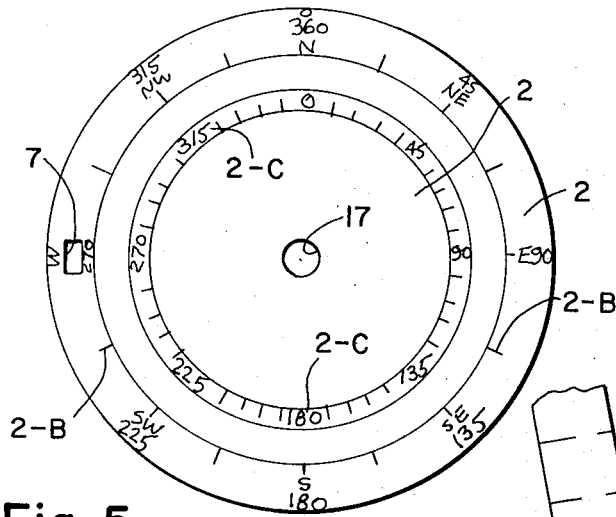

FIG. 4 is a plan view of the base plate, lubberline, concentric rivet lock means having a compass degree scale read through the readout disc shown in FIG. 5 shown as 7.

Figure 6:
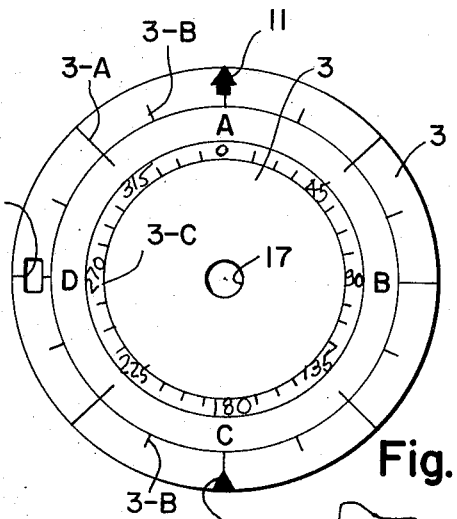

FIG. 5 is a plan view of the first concentric circular disc having two compass degree scales, one exposed as a compass scale and the other scale read through the readout disc in FIG. 6 shown as 8.

Figure 7:
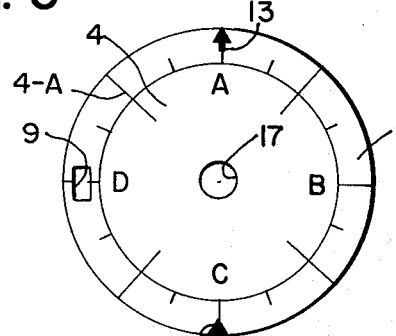

FIG. 6 is a plan view of the second concentric disc comprising an outer circular exposed wind vector scale and an inner smaller sized scale read through FIG. 7 shown as 9.

FIG. 7 is a plan view of the third concentric disc having an outer current vector scale and a readout box for reading indicia on the inner compass scale shown in FIG. 6.

Figure 8:
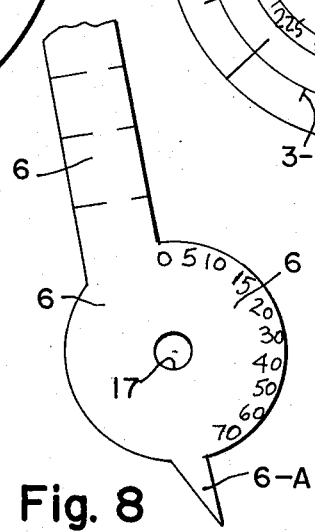

FIG. 8 is a top fragmentary view of a protractor arm 6 and a partial degree scale on the protractor arm disc having a reciprocal pointer 6a concentric to the other disc's connected by the rivet means 17.

Figure 9:
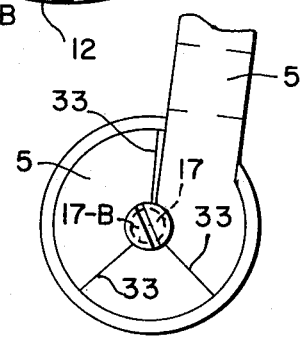

FIG. 9 is a top fragmentary view of a protractor arm 5 with the protractor disc showing safety lines disc concentrically aligned and pivoted on the rivet, having peripheral lines for a degree scale on disc 5 or read through transparent material on disc 6.

Figure 10:
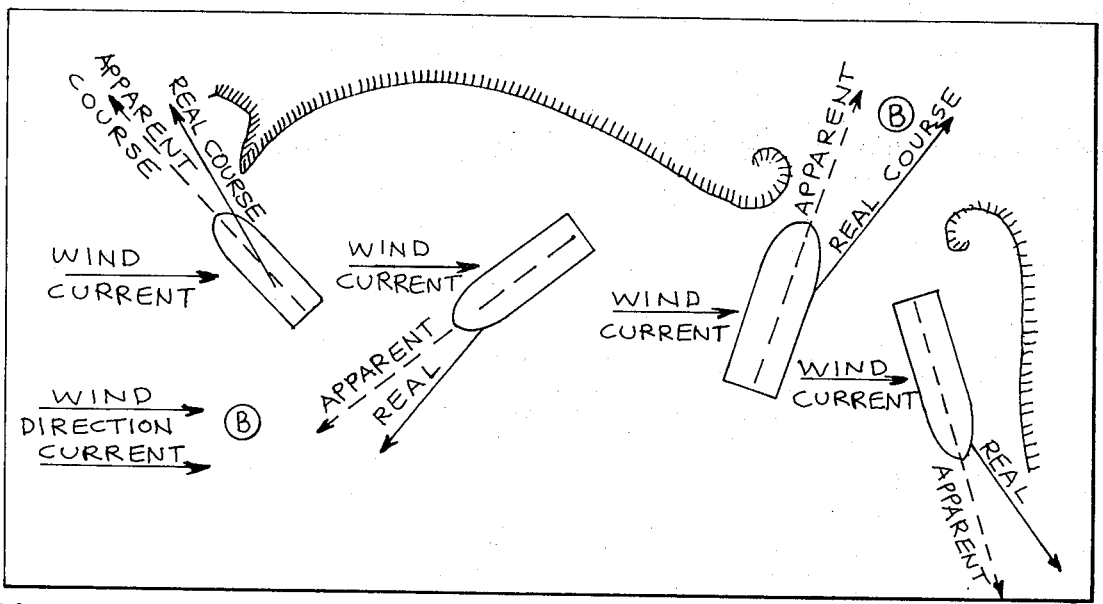

FIG. 10 is a plan view of a conventional marine situation showing the layout of various small craft examples where wind and currents on every vessel must be reasonably calculated to afford safe travel that this invention has taken into account.

Figure 11:
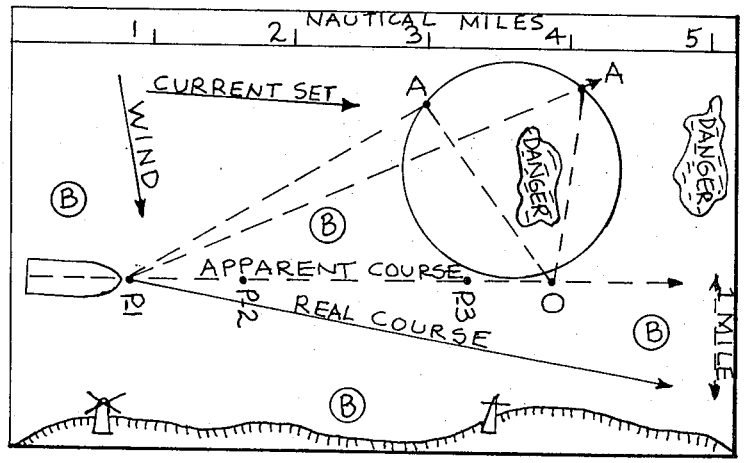

FIG. 11 is a plan view of a typical danger angle navigation problem where the wind and current disc's, multiarm protractor and compass scales gives the navigator the means for solutions he needs to accomplish safe journey.

Figure 12:
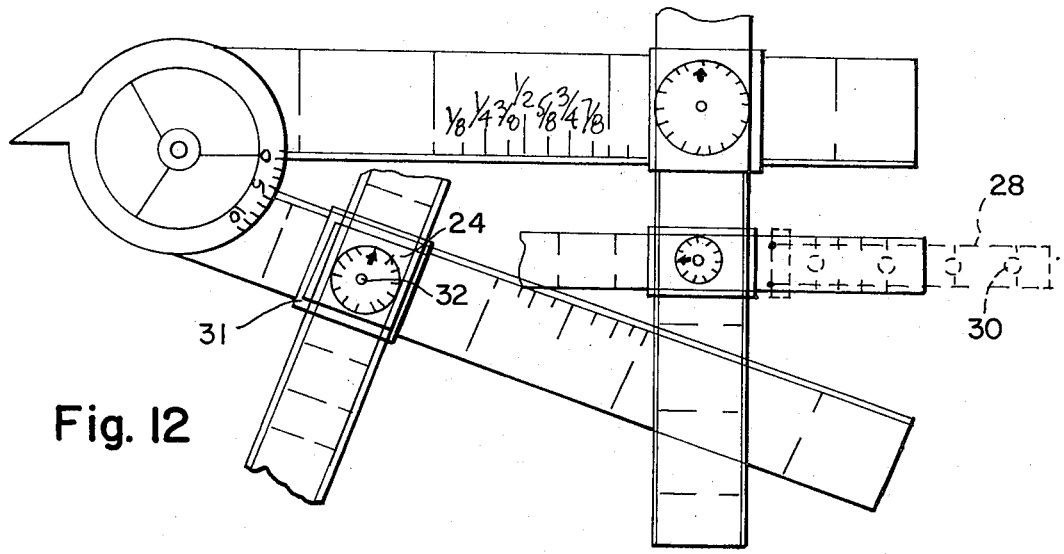

FIG. 12 is a plan view of the protractor arms arrangement with practically unrestricted movement and navigation use for problems in FIGS. 10 & 11.

Figure 13:
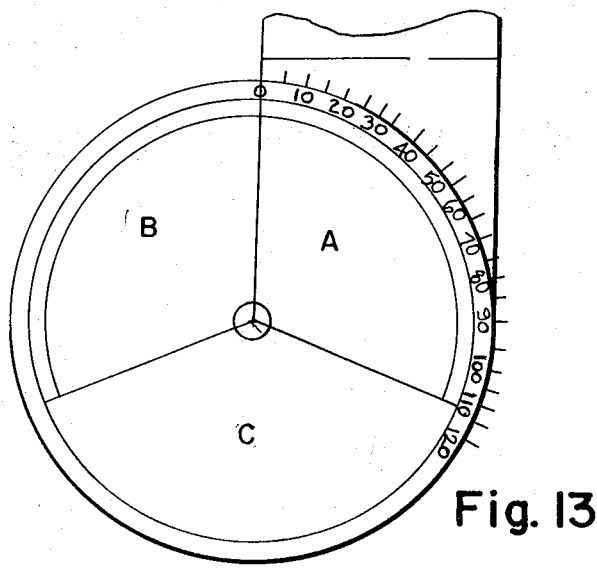

FIG. 13 illustrates a safety dial on a protractor disc.

Figure 14:
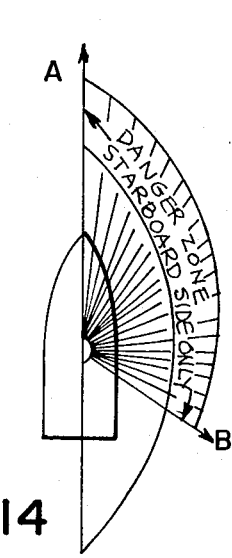
Figure 15:
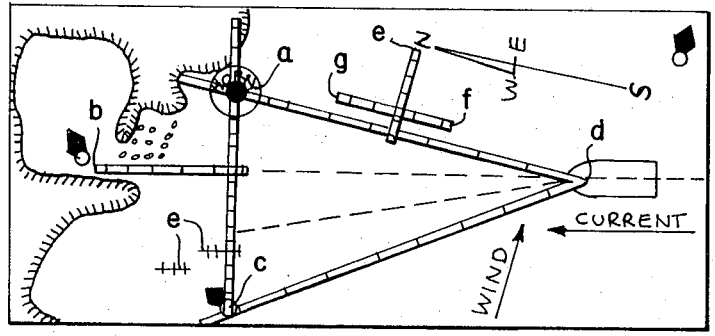
Figure 16:
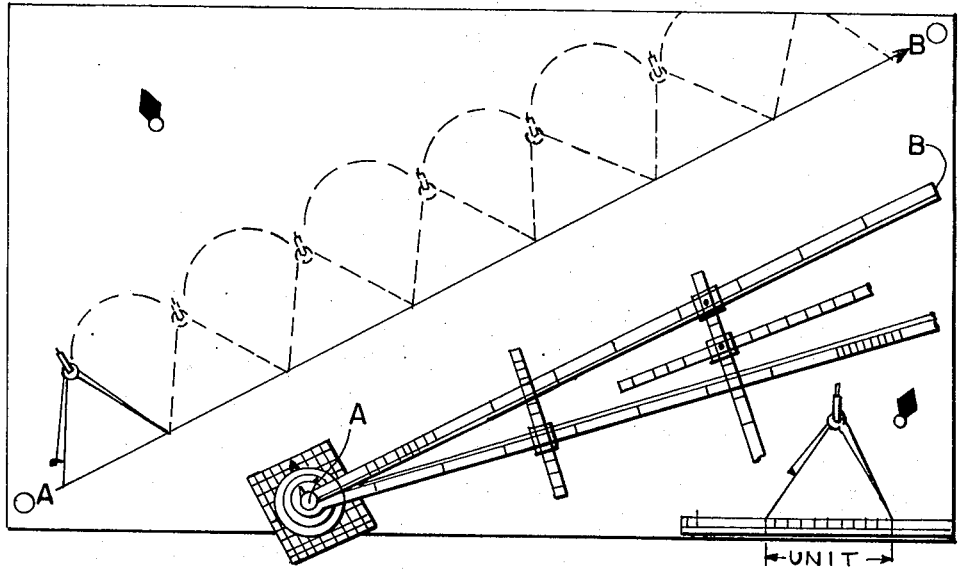

FIGS. 14, 15 and 16 represent graphic illustrations of examples fully explained in the disclosure.

Referring to the drawings FIG. 1 designates a navigation device showing several embodiments of the invention for determining bearings in conjunction with a magnetic compass. The base member 1 formed of plastic material having requisite properties of stress and durability for marine use having transparency and a lubberline marked at the top and bottom of the base member 1 by arrows. The base 1 shown in a square design can be of any suitable shape, for example of square shape, as illustrated, is provided with a circular compass scale 1 B having 360 degrees scale and grid lines 1A for charting use. The lubberline arrow marking on top 10 and on the bottom 10A, base member 1 has a central aperture 17 fitted for a rivet 17A shown in the drawings FIGS. 2 and 4 that extends through and holds together all the parts shown in drawings FIGS. 1 and 2.

A fastening screw can be threadably engaged at the top end of the rivet member 17A allowing fastening adjustment of all the superimposed concentric rotatable discs shown in the drawings, whereby the members are rotatably relative to each other around the pivot member 17A. The compass rose disc 2 has a circular degree scale 2B having a zero point in cooperation with adjustments of magnetic compass variation or deviation can be referred. Compass rose disc 2 is the first disc member concentrically pivoted to said base member 1 and of radius greater than said circular compass degree scale 1B shown in FIGS. 1 and 4 and overlying said arcuate degree scale 1B and marked at it's periphery with a compass scale graduated in degrees 2B indicating reference directions shown as north, south, east and west having one cutout 7 symmetrically placed at a radial distance from said pivot 17A and for example, as illustrated in FIGS. 1 & 5 at westerly point of the compass namely 270° west. Said cutout 7 is shown in FIGS. 1 and 5 in a rectangular form where the arcuate scale 1B shows the relative degree position of said first disc member 2 and base member 1 arcuate scale 1B. Any movement of disc 2 results in a change of relative position between scales 1B on base 1 and 2B on first disc 2 shown in degrees through the cutout window 7. Disc 2 shown in FIG. 5 comprises another arcuate compass degree scale at a lesser radial distance from the pivot 17A shown in FIG. 5 as 2C viewed through cutout 8 on circular disc shown in FIGS. 1 and 6. The second concentric rotatable wind calculation disc 3 shown in FIGS. 1 and 6 comprises direction reference arrows 11 and 12 respectively showing the direction the wind is going to and from in cooperation with the magnetic compass and in registration with a compass degree scale point shown through cutout 8 reading the degree information from the arcuate degree scale 2C on concentric disc 2. The disc 3 is divided into four divisions shown on FIG. 6 part 3A having other sub-divisions imposed thereon for wind directional bearings. The illustration in FIG. 6 showing wind disc 3 shows a favorable wind blowing from the south and assisting the boat shown as travelling in a northerly direction. Note the readout degree marking in the cutout 8 showing 0° wherein when this disc 3 is moved left or right the corresponding numerical extent of movement is shown in degrees of movement from the scale 2C on part 2 below. Another important improvement is shown in FIGS. 1 and 6 wherein the reference arrow 11 and 12 aligns with the outer arcuate degree scale 2B on the disc 2 pointing to the exact magnetic compass heading the wind movement has upon the vessel in terms of the direction it is coming from and where it points to with reference to direction. For illustration the smaller divisional lines 3B are compass points that are read in registration with the various settings of the compass degree scale 2B on compass rose disc 2. The numerical division of the wind disc into four quadrants in FIG. 6 illustrates another improvement embodied in this invention wherein the quadrants for illustration purposes are marked A,B,C and D. A represents a 90° scale of favorable wind direction as opposed to C wherein the reference arrow 11 were moved with the disc diagonally opposite representing opposing unfavorable winds which forces act upon resisting and lowering the speed of a vessel. Said speed is determined from bearings, weather reports, wind devices that are subsequently quantitatively used in the deduction of the effect upon various magnetic compass bearings and the true speed of the vessel in gaining headway. The combination of the embodiments in disc 3 are prodigious it facilitates the analysis of all wind direction in registration with a magnetic compass scale in cooperation the lubberline of a vessel where the simple values of markings A,B, C & D are numerically added or subtracted as units of direction to determine relative and apparent magnetic bearings. The wind disc 3 is shown in FIG. 6 and FIGS. 10 and 11 are illustrated examples where this would be employed to great advantage necessary in modern navigation. Disc 3 comprises another compass degree scale 3C shown in FIG. 6 read through window cutout 9 on current disc 4. The third concentric rotatable current calculation disc 4 shown in FIGS. 1 and 7 comprises direction reference arrows 13 and 14 respectively showing the direction the current is going to and the direction from in cooperation with a magnetic compass and in registration with a compass degree scale point shown through cutout 9 reading the degree information from the arcuate degree scale 3C on concentric disc 3. The disc 4 is divided into four divisions shown on FIG. 7 designated by lines marked 4A for illustration purposes also showing other subdivisions thereon for current directional bearings. The illustration in FIG. 7 shows a favorable current coming from the south, area c assisting a vessel with additional speed while traveling in this reference direction. Where a current would originate at A the forces would be opposed and the numerical value would be subtracted from the actual speed of a vessel. The movement of current from points B or D certainly affect the bearings also that are simplified by this invention. Note the readout degree marking in the cutout 9 showing 0° wherein when this disc 4 is moved to the left or the right the corresponding numerical value of movement is shown in degrees of movement from the scale 3C on the wind disc 3 below. Another important improvement is shown in FIGS. 1 and 7 wherein the reference arrows 13 and 14 aligns with the outer arcuate degree scale 2B on the compass rose 2 pointing to the exact magnetic compass heading the current movement has upon a vessel in terms of the direction it is coming from and it's direction of flow. For illustrative purpose the lines 4A are compass points that are read in registration with the various settings of the compass degree scale 2B on compass rose disc 2. The current disc 4 illustrated in FIG. 7 shows four quadrants where the disc 4 has been divided into four parts another improvement in this invention where said quadrants are marked A,B,C and D. Each represents an area of 90°. In this illustrated example A shows favorable currents flowing in the direction of travel as opposed to an example where the currents direction were flowing towards C therefore subtracting rather than adding to the speed of the vessel. Said speed of the currents is determined from bearings, charts, weather reports that are quantitively and directionally important necessary in the deduction of the effect upon various magnetic compass bearings and the true speed of the vessel gaining headway. The combination of the embodiments in disc 4 facilitate the analysis of all current determinations in cooperation with a magnetic compass scale, a lubberline where the simplified markings A,B,C and D are numerically added or subtracted as units of current direction to determine relative and apparent magnetic bearings. The current disc 4 is shown in FIG. 7 in detail and would employed to great advantage in handling the problem illustrations shown in FIGS. 10 and 11. The disc 4 has a central aperture 17 fitted for a rivet 17A shown on drawings FIGS. 2 and 4. The fourth concentric rotatable disc 6 shown in FIG. 8 has a central aperture 17 fitted for a rivet 17A shown on drawings FIGS. 2 and 4, having a reciprocal pointer 6A bearing a degree scale concentric with the pivot axis having a protractor arm 6 of transparent material having a straightedge aligned with the pivot axis and marked therealong with sets of distance scales as shown in FIGS. 1 and 12. The degree scale on disc 6 serves as an index means for reading against an angle between the straightedges of the protractor arm 6 and the protractor arm and disc 5. Further, said last named degree scale starts at zero on FIG. 8 showing the relative bearing that serves additionally as in determining various bearing vectors in cooperation with the scales located on the protractor arm slide 18 shown on FIGS. 1, 3, 3A and 12, wherein said degree scales are basically illustrated having similar features necessary for this navigation device. However, the actual slides 18 and 24 shown on FIG. 1 differ wherein slide 18 shown in detail on FIG. 3 is a single slide having central aperture and rivet to secure a third protractor arm, a fourth protractor arm, or more protractor arms as may be required for specific navigation calculations. Slide 24 shown on FIG. 1 and on FIG. 3A and in FIG. 12 is a double slide having two transparent slides 24 and 31 connected together by pivot means permitting totally free axial movement of both slides 24 and 31 said pivot means consisting of a rivet or grommet that is inserted through the top of one slide and the bottom of the other wherein one slide is swingable individually from the other each of said slides concentric with the pivot axis on a rivet 32 shown in FIG. 3A. This permits the slide 24 having a movable pointer 25A connected to the pivot that is in registration with a degree scale on slide 24 to freely travel on the protractor arm 6 and interchangeable to protractor arm 5 shown in FIGS. 1 & 9 and to a fourth arm 25 shown in FIG. 1, said slide 24 and said slide 31 allows two protractor arms to move freely on an independent axis in addition to having degree scales 19 and index means for reading against the compass rose projections 2, wind projections 3, current projections 4, protractor arm projections 6 and protractor arm projections 5 and first, second and third slide projections each having separate degree scales for registration with each other in juxtaposed relatively rotatable rotation to assist a navigator. The use of the slide 18 a single slide means with a pivot holding means attaching a protractor arm 20 shown in FIG. 1 offers another choice of construction and another improvement embodied in this invention. FIG. 3 shows the construction of slide 18 in a transparent model having two slide pressure springs 18A that keep the slide 18 in close tolerance with the protractor arms the slides operate on. The use of springs 18A on slides 24 and 31 are recommended along with other methods of popular attachment. Slides 18, 24 and 31 can also be made of non-transparent material in tolerances that would obviate the need for springs. The fifth concentric rotatable disc 5 shown in FIG. 9 has a central aperture 17 fitted for a rivet 17A shown on drawings FIGS. 2 and 4. A protractor arm 5 is part of the construction of the disc 5 made of transparent material, for example, to permit a view of the scale on the base 6 bearing degree graduations. This can also be accomplished by placing said scale on 6 to the disc 5 and placing an indicating point on 18. The movement of protractor arm 5 180° lengthens the linear measurement capacity in any position in cooperation with a magnetic compass rose 2. The protractor arm 5 and 6 in FIG. 1 shows fractional miles of travel or measurement, made to be used on charts having 1/20, 1/40 & 1/80 scales. This fractional advantage on the various protractor arms offers the navigator precision information relative to distances of objects & bearings absolutely inseperably a part of navigation. Further, in many instances it would obviate the time consuming need to employ other navigational devices to perform the same function accurately. The protractor arm shown in FIG. 9 has other advantages such as a pressure screw 17B in the center of the disc 5, having 3 radial lines at 120 degrees apart each shown as 33 a international safety dial showing the degree of responsibility of the navigator required in operating a vessel or teaching navigation. FIG. 9 for example shows the forward line 33 as a lubberline and the line to the right being 2 points abaft the beam that immediately shows the right of way. FIG. 13 shows an enlarged view of the three lines described on disc 5 wherein it shows the danger zone being the area around a boat clockwise from dead ahead to two points abaft the beam on the starboard side is called the danger zone. Other boats located in this zone that are approaching the course of your vessel have the right of way. Therefore, your boat must keep clear of boats in the danger zone. Other situations occuring in the operation of a vessel or in teaching navigation courses reveal the importance of said safety dial. The visual aid to analysis of priviledged and burdened vessels is apparent, a navigator can use this navigation device to great advantage by placing the multi-arm protractor on a scaled chart to determine his legal degree of responsibility. The amount of accidents caused by the lack of knowledge or the absence of this device makes said device helpful to all navigators and safe journey. Reference is directed to FIG. 14 wherein the same disc and the same lines are used in a diagram showing the arc covered by various lights. This conforms to public law 552 this device will assist to familiarize many small craft navigators in learning lighting and rules of the road requirements. FIG. 1 protractor arms 6 and 20 show locking means 29 to place the second member arm in an out of way attached position when out of use and same could be applied to each of the other arms in this invention. There are many ways to fasten same this is only an illustration. On FIG. 12 drawing the extended arm 28 is shown again in dotted lines having sight holes. There is also a suggestion that the protractor arms and their respective disc's 5 and 6 could be designed to be detachable and useful for many purposes in cooperation with charts and maps.

Further additional information is offered on the illustrations FIGS. 10, 13, 14, 15 and 16. With reference to FIG. 10 leeway is generally considered the sidewise movement of a vessel, but technically it is the angle between the direction which the vessel is heading and the direction which it is actually going. Note on FIG. 10 that when the port side is the windward side the vessel is on the port tack and her leeway makes her real course lie to the right of her apparent course. Leeway on the port tack has the same effect as an easterly compass error and leeway on the starboard tack has the same effect as a westerly error, these rules hold irrespective of the direction of the wind. FIG. 10 shows the current travelling in the same direction therefore having the same effect in this example illustration wherein this navigation device easily accomplishes the objectives shown in FIG. 10 by coordinating the use of a magnetic compass rose, wind and current disc's and a multiarm protractor. FIG. 13 is an enlargement of FIG. 9 disc 5 having markings A, B and C dividing this disc into three parts. Part A in FIG. 13 represents the danger zone known as the area located clockwise from dead ahead to two points abaft the starboard beam, it is this area which should give the navigator the greatest concern. Other craft located in the danger zone which are approaching the course of your vessel have the right of way over your boat. Therefore your boat must keep clear of boats in the danger zone. Boats located outside of your danger zone that are approaching your course, must give way to you. At night boats in your danger zone show you the red side light which is the danger signal for you to give way. Boats outside the danger zone show their green side light, the signal to you that they must give way. Therefore, FIG. 13 also serves the navigator in determining lighting in conjunction with safety in operating vessels or in teaching. FIG. 13 area A shows the green light area of 10 points on the starboard side, area B shows the red light area of 10 points on the port side, areas A and B together represent 20 points combined for requirements of a white light at the bow, areas A, B and C combined show the complete area a stern white light must show entirely around the horizon. These predetermined measurements save the time consuming effort of calculating points, the protractor arms in this invention will facilitate immediate readings for safety. FIG. 14 shows the area A discussed in FIG. 13 the danger zone. FIG. 15 shows an illustrated navigation example of a vessel proceeding on line d-b having taken a fix of points d, a and c and with the use of the multi arm protractor in this invention quickly accomplishes finding her position at d and making adjustments for area e showing sunken vessel hazards. You will note the use of the third protractor arm accross points a to c where a is a horn and c is a can buoy, this accomplishes a reading of distance from all points between a and c invaluable to the navigator. This third arm shows another arm attached with the embodied invention a fourth arm slidably associated and rotatable that has been placed to show the couse necessary to proceed into the harbor shown, and the movement of the fourth arm does not effect the fix position. Another protractor arm e is shown also lidably and rotatably affixed wherein the arm has another arm attached protractor arm six used in this illustration as a parallel bar. This would be particularly useful in making course adjustments for wind and currents as shown in FIG. 15 where a vessel travelling in a general northerly direction has wind forces from the west and favorable current course from the South adding to the speed of the craft. It is an established criterion that wind and current forces are extremely important factors in navigation and such must be taken into account for the operation of a vessel and in the training of inexperienced boat-owners on lakes, rivers and our shorelines to safeguard property and life. This widespread subject is a matter of discussion in every navigation textbook. FIG. 16 shows the comparison of a navigation calculation of distance performed by the divider a hand held instrument that must be held firmly so as not to slip or lose it's tension that is rotated by hand on a chart in units as shown to find the distance. In FIG. 16 the same example is accomplished quite differently with this invention from points A to B in addition to having a second protractor arm for measuring bearings and distances between bearings on the third arm that also has attached a fourth arm for parallel measurements or axial degree movement used in a number of navigation instances. The ease of accomplishing the example in FIG. 16 is self explanatory with this invention an experienced or inexperienced person will benefit from it's use. Regarding FIG. 16 reference is directed to Piloting Seamanship and Small Boat Handling by Charles F. Chapman 1969–70 edition wherein FIG. 1930 page 337 (h) shows the same basic example of dividers in use. Their explanation on Page 337 (g) under dividers chapter three states, "if the distance on the chart cannot be spanned with the dividers opened widely (about 60° is the maximum practical opening), set them at a convenient opening for a whole number of units on the graphic scale or latitude subdivisions, step this off the necessary number of times, then measure the odd remainder. The total distance is then the simple sum of the parts stepped off and measured separately." This operation by comparison of devices allows greater human error in handling the dividers and stepping them off and in counting the number of turns and then having to add the remainder to find a sum total. FIG. 16 shows the difference when requiring less expertise and time resulting in more accurate answers. There is a distinction between vessel that travel the oceans and the inland boat-owner having little time to calculate his courses in inlets and inland-waterways where many hazards present safety problems to life and property where the ship at sea has time to do, with professional personnel. Further reference is directed to an authoritative source such as Bowditch 1962 H.O. Pub. NO. 9 wherein the following definitions in their proper context are helpful in presenting additional facts heretofore touched upon in this patent application. Page 62 Navigation is the process of directing the Movements of a craft from one point to another. The word navigate is from the Latin navigatus, the past participle of the verb navigere which is derived from the word navis, meaning ship and agere meaning to move or direct. Current article 807 page 217 water in essentially horizontal motion over the surface of the earth is called current, the direction in which the water is moving is called the set, and the speed is called the drift. In navigation it is customary to use the term current to include all factors introducing geographical errors in the dead reckoning, whether their immediate effects are upon the vessel or the water. Page 953 Wind, Moving air especially a mass of air having a common direction of motion. Wind current, A current created by the action of the wind. Wind Direction, The direction from which wind blows. Page 916, Centering error, That instrumental error due to inaccurate pivoting of a moving part. Page 919 Countercurrent, A secondary Current flowing adjacent and in the opposite direction to another current. From the above definitions we can asseverate the importance of the many embodiments of this invention fully described in the disclosure and illustrated in the 16 figures of this patent application.

It will be observed that from the foregoing I have described preferred embodiments of my invention in detail.

However, I do not desire to limit this invention to those exact details except in so far as they may be defined by the following claims I desire to secure letters Patent, I claim;

1. A navigation device comprising a base plate having a compass rose disposed about a central aperture, a plurality of concentrically mounted circular disc members rotatably mounted on said base plate on a common pivot axle extending through said central aperture, said disc members having diameters of decreasing size with the largest adjacent the base plate and the smallest at the top, each disc member having a compass rose upon its surface and means for viewing the compass rose on the disc immediately below it, said disc members and base plate cooperating to insert various navigation parameters such as compass deviation, compass reading, wind direction and current direction so that the various parameters are utilized to give a final reading; first and second protractor arms having circular base portions and radially extending arms concentrically pitotally mounted on said common pivot axle atop said plurality of disc members with the second of said protractor arms being uppermost, a longitudinal edge of each arm passing transversely through the vertical axis of the common axle, said arms having linear distance scales along the edges and adapted to measure and draw course lines on a chart, said first circular base portion having compass rose about the central axis and a reciprocal transparent index marker extending from the circumference thereof in line with the central axis and longitudinal edge to indicate reciprocals, said uppermost second base portion having a compass rose on the surface thereof and a safety right of way and vessel lighting dial inscribed thereon comprising three radial lines extending from the center axle to the circumference and spaced 120° apart; a first transparent slide member slidably mounted on said first protractor arm and having a compass rose thereon, a third protractor arm pivotally mounted on said first slide member and having an index marker to cooperate with said compass rose, a second transparent slide member slidably mounted on said third protractor arm, said second slide member having a third transparent slide member pivotally mounted thereon and also having a compass rose thereon, a fourth protractor arm slidably received in said third slide member, index means connected to said fourth protractor arm to cooperate with said last mentioned compass rose; means on said first, second and third slide members for frictionally retaining the slide members in adjusted positions on their respective arms and means on said first and third arms for locking said third arm atop said first arm in a non-use position.

2. The navigation device of claim 1 wherein a linear arm is adjustably coextensively attached to the end of said third protractor arm.

3. The navigation device of claim 2 wherein a slide member similar to said pivotally connected second and third slide members is slidably mounted on said second protractor arm for receiving a fifth protractor arm.

* * * * *